US006875387B2

(12) United States Patent
Mhetar et al.

(10) Patent No.: US 6,875,387 B2
(45) Date of Patent: Apr. 5, 2005

(54) POLYPHENYLENE ETHER COMPOSITIONS WITH IMPROVED DIE LIP BUILDUP PERFORMANCE

(75) Inventors: Vijay Mhetar, Slingerlands, NY (US); Jeffery Gary Tenenbaum, West Coxsackie, NY (US)

(73) Assignee: General Electric, Pittfield, MA (US)

( * ) Notice: Subject to any disclaimer, the term of this patent is extended or adjusted under 35 U.S.C. 154(b) by 198 days.

(21) Appl. No.: 10/248,009

(22) Filed: Dec. 10, 2002

(65) Prior Publication Data

US 2004/0110902 A1 Jun. 10, 2004

(51) Int. Cl.$^7$ .............................. D01F 1/02; B28B 3/20; B29C 47/00
(52) U.S. Cl. ..................................... 264/211; 264/176.1
(58) Field of Search ............................ 264/176.11, 211

(56) References Cited

U.S. PATENT DOCUMENTS

| | | |
|---|---|---|
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,914,266 A | 10/1975 | Hay |
| 4,028,341 A | 6/1977 | Hay |
| 4,076,698 A | 2/1978 | Anderson et al. |
| 4,584,334 A | 4/1986 | Lee, Jr. et al. |
| 4,806,297 A | 2/1989 | Brown et al. |
| 4,806,602 A | 2/1989 | White et al. |
| 4,816,510 A | 3/1989 | Yates, III |
| 4,935,472 A | 6/1990 | Brown et al. |
| 5,089,566 A | 2/1992 | Brown et al. |
| 5,231,146 A | 7/1993 | Brown et al. |
| 5,237,005 A | 8/1993 | Yates, III |
| 5,290,881 A | 3/1994 | Dekkers |
| 5,435,708 A | 7/1995 | Kaun |
| 5,859,130 A | 1/1999 | Gianchandai et al. |
| 5,916,970 A | 6/1999 | Lee, Jr. et al. |
| 5,981,656 A | 11/1999 | McGaughan et al. |
| 6,245,271 B1 | 6/2001 | Jacobs et al. |

FOREIGN PATENT DOCUMENTS

| | | |
|---|---|---|
| EP | 0 362 660 A2 | 11/1990 |
| EP | 0 401 690 A2 | 12/1990 |
| WO | WO 02/28971 | 4/2002 |

OTHER PUBLICATIONS

International Search Report; International Application No. PCT/US 03/38220; International Filing Date Mar. 12, 2003; Date of Mailing Oct. 5, 2004.

*Primary Examiner*—Stephen J. Lechert, Jr.

(57) ABSTRACT

A process for reducing lip buildup during an extrusion of a polyphenylene ether composition comprises adding a linear low density polyethylene compound to the composition, wherein the amount of linear low density polyethylene compound is less than or equal to about 10 percent by weight based on the amount of polyphenylene ether compound in the composition.

16 Claims, No Drawings

POLYPHENYLENE ETHER COMPOSITIONS WITH IMPROVED DIE LIP BUILDUP PERFORMANCE

BACKGROUND

The present disclosure relates to a polyphenylene ether composition with improved die lip buildup performance. In particular, the present disclosure relates to a polyphenylene ether composition wherein the levels of die lip buildup are substantially reduced. The present disclosure also relates to a process for the preparation of a polyphenylene ether composition with improved die lip buildup performance.

Polyphenylene ether (PPE) resin compositions are useful in several industries depending on the intrinsic viscosity thereof such as adhesives, sealants, gels, automotives, cabling, electrical applications, aerospace, sporting equipment, electrical laminates, and IC encapsulation materials. Polyphenylene ether resins are also useful as additives for various thermoplastic and thermoset materials. Polyphenylene ether resins can also be used to improve the heat performance, flame retardant properties, decrease of some electrical properties, decrease in moisture absorption, increased creep resistance, thermal expansion reduction, and the like in several applications. The physical, electrical and chemical properties of polyphenylene ether resin compositions make them ideal for a wide variety of industrial applications. Polyphenylene ether resin compositions can be manufactured by film/sheet extrusion, blow molding, film blowing, extrusion coating, and fiber spinning. However, such manufacturing processes suffer from a significant disadvantage in the formation of a die lip during the process. Die lip buildup is a phenomenon in which material accumulates at the open faces of the die during extrusion. Excessive die lip buildup diminishes both the aesthetic quality and engineering properties of the product, and it can force a shut down of the processing operation resulting in a huge loss in productivity. It is often necessary to shut down the process in order to enable cleaning of the die to ensure that the product formed is uniform and does not suffer from any surface defects occasioned due to the formation of the die lip buildup. This results in a downtime in the manufacturing process and increased costs.

The formation of die lip buildup can, for example, affect the surface qualities of the product being manufactured due to the formation of melt fractures and deformities. Die lip build up is a problem faced in several polymer extrusion processes. However, this problem is particularly significant in the extrusion of polyphenylene ether resin compositions. Several methods have been proposed to overcome this problem including mechanical alterations to the die shape and size.

For example, U.S. Pat. No. 5,435,708 teaches a melt blowing die head with opposing die lips mounted on lip guides pivotally connected to respective set back bars. To facilitate cleaning of the die, the lips are swung away from the spinneret on the respective lip guides. While this results in reduced down time in the maintenance of the die, it does not avoid the problem of stopping the manufacturing process, and does not facilitate cleaning or maintenance during manufacturing operation.

U.S. Pat. No. 6,245,271 teaches a process for die extrusion of melted polymers that reduces die lip buildup. The process comprises providing at least two separate sources of compositions containing the molten thermoplastic polymer, then combining the compositions within a die into layers where one layer is exposed and is of a specified thickness (not more than 15% thickness of the two layers), and then extruding the combined layers. The die lips have a specific radius of curvature in the range of from 0.5 mil to 3 mils. This disclosure focuses on the alteration of the die lip and the formation of two distinct layers. The patent does not mention any other factor as being important for avoiding die lip buildup. A disadvantage of this patent is its limited applicability to the manufacture of fibers for applications such as diapers and incontinence garments. It does not solve the problem of different sized die lips. Also, on the face of it, this appears to be incapable of being performed where the die lips are of dimensions beyond those specified dimensions. This disclosure is also silent of its applicability in respect of polyphenylene ether resin compositions.

WO 02/28971 teaches a polyphenylene based composite resin composition for injection molding an IC tray, wherein the composition comprises polyphenylene oxide or polyphenylene ether in an amount of 20 to 98% by weight of the total composition, one or more resins are included which are selected from the group consisting of polystyrene, polyphenylene sulfide, polyetheramide, polycarbonate, and polyethylene including high density polyethylene, low density polyethylene, linear low density polyethylene, and very low density polyethylene in an amount of 1 to 40% by weight of the total composition and inorganic and glass fiber as fillers in an amount of 1 to 40% by weight of the total composition. While it is claimed that this composition has enhanced mechanical strength, dimensional stability, low linear fever expansion coefficient, and good outlook of the product, there is no disclosure or teaching therein of any reduction in die lip formation.

It is therefore desirable to provide a method by which die lip buildup in polyphenylene ether resin compositions can be avoided or minimized, thereby providing significant advantages in the manufacture of PPE resin based articles such as reduction in down time.

BRIEF SUMMARY

Disclosed herein is a method for reducing die lip buildup during extrusion of a polyphenylene ether composition. The method comprises mixing a linear low density polyethylene in an amount greater than or equal to about 1 to greater than or equal to about 10 parts by weight for every 100 parts by weight of the polyphenylene ether resin in the composition to form a blend; and extruding the blend to obtain an extrudate of the polyphenylene ether resin composition, wherein lip build up is reduced relative to polyphenylene ether compositions free of the linear low density polyethylene.

In another embodiment, a method for reducing die lip buildup during extrusion of a polyphenylene ether composition comprises mixing a linear low density polyethylene in an amount greater than or equal to about 1 to greater than or equal to about 10 parts by weight for every 100 parts by weight of the polyphenylene ether resin in the composition and mixing a high impact polystyrene compound in an amount of about 1 to about 40 parts by weight of the composition to form a blend; and extruding the blend to obtain an extrudate of the polyphenylene ether resin composition, wherein lip build up is reduced relative to polyphenylene ether compositions free of the linear low density polyethylene.

A polyphenylene ether composition comprises a polyphenylene ether compound; and a linear low density polyethylene compound in an amount greater than or equal to about 1 to less than or equal to about 10 parts by weight for every 100 parts by weight of the polyphenylene ether resin, wherein the polyphenylene ether compound has an intrinsic viscosity of about 0.33 to about 0.46, and the linear low density polyethylene has a melt flow index less than about 30 grams per 10 minutes as measured in accordance with ASTM D-1238, and a density of about 0.90 to about 0.94 grams per cubic centimeter.

The above described and other features are exemplified by the following figures and detailed description.

DETAILED DESCRIPTION

Disclosed herein are processes and polyphenylene ether compositions for reducing die lip buildup. The polyphenylene ether polymers (also referred to herein as "PPE") used in compositions are known polymers comprising a plurality of aryloxy repeating units preferably with at least 50 repeating units of Formula (I):

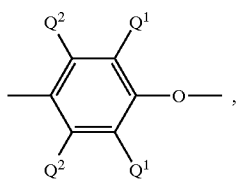

wherein in each of said units independently, each $Q^1$ is independently hydrogen, halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula (I), aminoalkyl, hydrocarbonoxy or halohydrocarbonoxy wherein at least two carbon atoms separate the halogen and oxygen atoms and at least two carbon atoms separate the halogen atoms and the phenyl nucleus of Formula (I).

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula (I), hydrocarbonoxy groups or halohydrocarbonoxy groups wherein at least two carbon atoms separate the halogen and oxygen atoms and at least two carbon atoms separate the halogen atoms from the phenyl nucleus of Formula (I). Each $Q^1$ and $Q^2$ suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes unsubstituted polyphenylene ether polymers, substituted polyphenylene ether polymers wherein the aromatic ring is substituted, polyphenylene ether copolymers and blends thereof. Also included are polyphenylene ether polymers containing moieties prepared by grafting onto the polyphenylene ether in a known manner such materials as vinyl monomers or polymers such a polystyrenes and elastomers, as described in U.S. Pat. No. 5,089,566 issued to S. Bruce Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

The polyphenylene ether polymers used in the compositions may also have various end groups such as amino alkyl containing end groups and 4-hydroxy biphenyl end groups, typically incorporated during synthesis by the oxidative coupling reaction. The polyphenylene ether polymers may be functionalized or "capped" with end groups, which add further reactivity to the polymer and in some instances provide additional compatibility with other polymer systems, which may be used in conjunction with the polyphenylene ether polymers to produce an alloy or blend. For instance, the polyphenylene ether polymer may be functionalized with an epoxy end group, a phosphate end group or ortho ester end group by reacting a functionalizing agent such as 2-chloro-4(2-diethylphosphato epoxy)6-(2,4,6-trimethyl-phenoxy)-1,3,5-trizene, with one of the end groups of the polyphenylene ether polymer, i.e., one of the terminal hydroxyl groups.

It will be apparent to those skilled in the art from the foregoing that the polyphenylene ether polymers contemplated for use include all of those presently known, irrespective of the variations in structural units.

Suitable polyphenylene ether polymers useful include but are not limited to poly (2,6-dimethyl-1,4-phenylene ether); poly(2,3,6-trimethyl-1,4-phenylene) ether; poly (2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene)ether; poly(2,6-dilauryl-1,4-phenylene) ether; poly(2,6-diphenyl-1,4-phenylene) ether; poly (2,6-dimethoxy-1,4 phenylene) ether; poly(2,6-diethoxy-1,4-phenylene) ether; poly (2-methoxy-6-ethoxy-1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2-ethoxy-1,4-phenylene) ether; poly(2-chloro-1,4-phenylene) ether; poly(2,6-dibromo-1,4-phenylene) ether; poly(3-bromo-2,6-dimethyl-1,4-phenylene) ether; mixtures thereof, and the like.

Suitable copolymers include random copolymers containing 2,6-dimethyl-1,4-phenylene ether units and 2,3,6-trimethyl-1,4-phenylene ether units.

The polyphenylene ether resins employed in the compositions of this invention have an intrinsic viscosity greater than about 0.2 dl/g, as measured in chloroform at 25° C., and generally have a number average molecular weight within the range of about 3,000 to 40,000 and a weight average molecular weight in the range of 20,000 to 80,000, as determined by gel permeation chromatography.

The polyphenylether ether polymers suitable for use in this invention may be prepared by any of a number of processes known in the art from corresponding phenols or reactive derivatives thereof. Polyphenylene ether resins are typically prepared by the oxidative coupling of at least one monohydroxy aromatic compound such as 2,6-xylenol or 2,3,6-trimethylphenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride-trimethylamine. Catalyst systems that contain manganese compounds are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride-and manganese chloride-sodium methylate. Suitable cobalt type catalyst systems contain cobalt salts and an amine.

Examples of catalyst systems and methods for preparing polyphenylether resins are set forth in U.S. Pat. Nos. 3,306,874, 3,306,875, 3,914,266 and 4,028,341 (Hay); U.S. Pat. Nos. 3,257,357 and 3,257,358 (Stamatoff); U.S. Pat. Nos. 4,935,472 and 4,806,297 (S. B. Brown et al.); and U.S. Pat. No. 4,806,602 issued to Dwayne M. White et al.

In general, the molecular weight of the polyphenylene ether resins can be controlled by controlling the reaction time, the reaction temperature, and the amount of catalyst. Longer reaction times will provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like or the product may be separated from the catalyst by filtration, precipitation or other suitable means as taught by Hay in U.S. Pat. No. 3,306,875.

The PPE composition preferably comprises a compatibilized or functionalized PPE polymer, wherein compatibility is meant to include the minimization of gross phase separation between the components of the blend (i.e., the PPE polymer and any other ingredients of the blend). Increased tensile elongation, reduced delamination tendency, increased ductility and improved phase morphology stabilization are generally indicators of improved compatibilization. The desirable physical properties of the blend are determined partly by the improvement in the compatibilization between the blend components.

Polyolefins such as linear low density polyethylenes (LLDPE's) are known to be utilized as such, or as a component in blend with other polymers, for the formation of films which are designed for a variety of end use purposes, like films for the consumer market such as household disposable, trash bags and liners; overwrap films and bags for laundry and dry cleaning goods; and shipping and carryout bags for retain merchandising. LLDPEs are desirable as a resin for films of such end use designs because of its relatively low cost compared to other resin types, e.g., polyvinylchloride, and because it possesses in combination with this low cost an excellent set of mechanical, physical, and chemical properties such as tensile strength, secant modulus, tensile tear strength, puncture resistance, elongation at break, and the like. However, there is no teaching in the art as to the use of LLDPE's for reducing die lip formation during extrusion of PPE resin containing compositions without compromising on the qualities of the PPE resin compositions.

The present disclosure resides in the surprising recognition that addition of small amounts of LLDPE to PPE composition eliminates and/or significantly reduces die lip buildup during extrusion processes.

The preferred linear low density ethylene copolymers (LLDPE) have a density of about 0.88 to about 0.96, with a density of about 0.90 to about 0.94 more preferred, and with a density of about 0.92 to about 0.93 even more preferred. A melting point of the preferred LLDPEs is preferably at about 100° C. to about 136° C., and with about 110° C. to about 130° C. even more preferred. A melt index of the preferred LLDPEs is preferably less than or equal to about 40 grams per 10 minutes as measured in accordance with ASTM D-1238, with a melt index of less than or equal to about 30 grams per 10 minutes more preferred, with a melt index of less than or equal to about 20 grams per 10 minutes even more preferred. In a preferred embodiment, the melt index is about 10 to about 20 grams per 10 minutes as measured in accordance with ASTM D-123. Suitable olefin comonomers for incorporation into the polyethylene backbone include butene, pentene, heptene, octane, and hexene. The LLDPE may be prepared by any of various methods known in the art, e.g., by relatively low pressure methods as disclosed, for example, in U.S. Pat. No. 4,076,698. As is known in the art, these polymers or copolymers are formed in the presence of Ziegler-Natta, Metallocene or Phillips catalysts containing titanium, chromium, zirconium, magnesium, and admixtures thereof, which give rise to the catalyst residues in the as-polymerized [as-synthesized] resin.

LLDPE is preferably present in an amount of less than or equal to about 10 percent relative to the amount of polyphenylene ether compound in the PPE composition, with less than or equal to about 8 percent more preferred, with less than or equal to about 6 percent even more preferred, and with less than or equal to about 4 percent most preferred. Also preferred, the LLDPE is preferably present in an amount of greater than or equal to about 1 percent relative to the amount of polyphenylene ether compound in the PPE composition, with greater than or equal to about 2 percent more preferred, with greater than or equal to about 3 percent even more preferred, and with greater than or equal to about 4 percent most preferred. Unexpectedly, it has been found that upon addition of the LLDPE to the PPE composition, the time for lip build up to occur during the extrusion process is significantly reduced. Moreover, unlike injection molding processes where delamination can occur at concentrations greater than 2 parts be weight of the composition due to the increased shear associated with injection molding processes, extrusion processes exhibit much less shear and as a result, delamination has been found to not occur at the preferred amounts of LLDPE.

The PPE composition may also include effective amounts of at least one additive selected from the group consisting of flame retardants, drip retardants, dyes, pigments, flow enhancers, impact modifiers such as high density polystyrene, colorants, reinforcing agents, fillers, glass fibers, stabilizers, antistatic agents, plasticizers and lubricants. These additives are known in the art, as are their effective levels and methods of incorporation. Effective amounts of the additives vary widely, but they are usually present in an amount from about 1 to 30 about percent by weight, based on the weight of the entire composition.

The PPE composition is generally prepared by blending the ingredients under conditions appropriate to obtain an intimate blend. The blending can be done using a single, a twin-screw type extruder, or any other mixing device capable of applying a shear to the blend. All ingredients may be added initially to the processing system. In the alternative, certain additives may be pre-compounded with each other or with one of the primary polymer components, PPE and LLDPE. It is believed that properties such as impact strength and elongation may be enhanced by initially pre-compounding the PPE with at least one of the typical agents used to functionalize PPE prior to blending with the LLDPE. The compositions may also be prepared using separate extruders in the processing or using a single extruder with multiple feed ports enabling the addition of multiple components during processing. It is preferable to employ at least one vent port in each section between the feed ports to allow venting (either atmospheric or vacuum) of the melt. Volatile impurities in the blend composition for example, can be removed by applying a vacuum to the melt through a vent port provided in the mixing device. Blending times and temperatures, as well as component addition, can be adjusted by those skilled in the art without undue experimentation.

Improved extruded articles prepared from the compositions of the present disclosure also represent another embodiment of this disclosure.

In certain embodiments, the various resins which may be blended with the PPE resin compositions include vinyl aromatic resins, polyamides as disclosed in U.S. Pat. Nos. 5,981,656 and 5,859,130, polyarylene sulfides as disclosed in U.S. Pat. No. 5,290,881, polyphthalamides as disclosed in U.S. Pat. No. 5,916,970, polyetheramides as disclosed in U.S. Pat. No. 5,231,146 and polyesters as disclosed in U.S. Pat. No. 5,237,005.

The vinyl aromatic resins that may be added to the PPE blends of this invention comprise polymers that contain at least 25% by weight of structural units derived from a monomer of the formula:

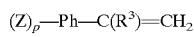

wherein Ph is phenyl, R³ is hydrogen, lower alkyl or halogen, Z is vinyl, halogen or lower alkyl and p is 0 to 5. These vinyl aromatic polymers include homopolystyrene, polychlorostyrene, polyvinyltoluene, and rubber modified polystyrene (sometimes referred to as "HIPS") comprising blends and grafts with elastomeric polymers, as well as mixtures of these materials. Styrene-containing copolymers such as styrene-acrylonitrile copolymers (SAN), styrene-maleic anhydride copolymers, polyalpha-methylstyrene and copolymers of ethylvinylbenzene, divinylbenzene are also suitable.

The vinyl aromatic polymers are prepared by methods well recognized in the art including bulk, suspension and emulsion polymerization. The amount of vinyl aromatic resin added to the PPE blends of this invention depends on the properties contemplated and typically ranges from about 5% to 90% by weight, preferably from about 15% to about 60% by weight, based on the weight of the total composition.

Examples of suitable polystyrene resins are generally known in the art and are described for example in Chapter 3 of Organic Polymer Chemistry, 2$^{nd}$ edition K. G. Saunders, Chapman and Hall, 1988 and in U.S. Pat. No. 4,816,510, issued to John B. Yates III.

The following examples are provided to illustrate some embodiments of the present disclosure. They are not intended to limit the disclosure in any aspect. All percentages are by weight based on the total weight of the entire composition, unless otherwise indicated and all parts are parts by weight.

EXAMPLE 1

Fifteen different compositions were formulated as shown in Table 1, and extruded. The PPE compositions comprised polyphenylene oxide (PPO) polymers having different intrinsic viscosities, LLDPE, and/or high impact polystyrene (HIPS). Prior to extrusion, the composition was dried at 180° F. for a period of about 2 to about 4 hours. During extrusion, the time at which visible die lip buildup occurred was qualitatively recorded for a maximum time period of greater than about 180 minutes. In addition, the time at which the quality of the film began to be affected by the buildup was also qualitatively recorded.

The polyphenylene oxide polymer having an intrinsic viscosity of 0.33 grams per cubic centimeter (g/cm³) was C8395 from the General Electric Company the polyphenylene oxide polymer having an intrinsic viscosity of 0.40 (g/cm³) was C2020 from the General Electric Company; and the polyphenylene oxide polymer having an intrinsic viscosity of 0.46 (g/cm³) was C2000 from the General Electric Company. Where indicated, a high impact polystyrene impact modifier was added to the composition. The impact modifier was EB 6755 available from Chevron. The LLDPE was LL-5100 from the Exxon Mobil Corporation.

The extruder, a 0.75 inch single screw extruder from C. W. Brabender Instruments Inc., was purged and then the die (4" width, 0.015" gap film die) was also purged for approximately 15 minutes before each run with the material to be used in the run. After purging, the extruder was stopped and the die cleaned thoroughly. The extruder was then started after setting the timer to zero. The extrudate was processed with one of three different temperature profiles for the various zones of the extruder. Profile A had a temperature profile of 260, 280, 300, 300, and 300° C.; profile B had a temperature profile of 240, 260, 280, 280, and 280° C.; and profile C had a temperature profile of 220, 240, 260, 260, and 260° C. The throughput of each sample was approximately 10.3 lb/hour with a screw revolution of 100 per minute.

TABLE 1

|    | PPO IV = 0.33 | PPO IV = 0.40 | PPO IV = 0.46 | HIPS | LLDPE | Time for Visible Buildup | Time for Film Defects | Temperature Profile |
|----|------|------|------|------|------|-------|-------|---|
| 1  | 50.0 |      |      | 50.0 |      | 40    | 55    | B |
| 2  |      | 50.0 |      | 50.0 |      | 23    | 37.5  | A |
| 3  |      |      | 50.0 | 50.0 |      | 15    |       | A |
| 4  | 50.0 |      |      | 50.0 | 1.0  | 95.0  | 135   | B |
| 5  | 50.0 |      |      | 50.0 | 2.0  | 135.0 | >180  | B |
| 6  | 50.0 |      |      | 50.0 | 3.0  | >180  |       | B |
| 7  | 50.0 |      |      | 50.0 | 4.0  | >180  |       | B |
| 8  |      |      | 50.0 | 50.0 | 1.0  | 57.5  | 95    | A |
| 9  |      |      | 50.0 | 50.0 | 2.0  | 92.5  | 135   | A |
| 10 |      |      | 50.0 | 50.0 | 2.5  | 125.0 | >180  | A |
| 11 |      |      | 50.0 | 50.0 | 3.0  | 165.0 |       | A |
| 12 |      | 50.0 |      | 50.0 | 2.0  | 102.5 |       | A |
| 13 |      | 50.0 |      | 50.0 | 2.5  | 145.0 |       | A |
| 14 |      | 25.0 |      | 75.0 |      | 47.5  |       | C |
| 15 |      | 25.0 |      | 75.0 | 2.0  | >180  |       | C |

The results indicate that those PPE compositions that did not contain LLDPE unexpectedly exhibited the shortest times for lip buildup to occur. Compositions 1–3 visibly exhibited lip buildup in less than 40 minutes. Moreover, it appears that by increasing the intrinsic viscosity of the polyphenylene ether compound, the time in which lip buildup occurred decreased. Compositions 4–7, 8–11, and 12–13 demonstrate the effect on increasing the amount of LLDPE in the PPE composition. Clearly, it is shown that increasing LLDPE in the composition increases the time in which lip buildup occurs.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for reducing die lip buildup during extrusion of a polyphenylene ether composition, the method comprising:

extruding a composition comprising a polyphenylene ether resin and a linear low density polyethylene in an amount greater than or equal to about 1 to less than or equal to about 10 parts by weight for every 100 parts by weight of the polyphenylene ether resin to obtain an extrudate of the polyphenylene ether resin composition, wherein lip build up is reduced relative to polyphenylene ether compositions free of the linear low density polyethylene.

2. The method as claimed in claim 1 wherein the polyphenylene ether has an intrinsic viscosity of about 0.33 deciliters/gram to about 0.46 deciliters/gram as measured in chloroform at 25° C.

3. The method as claimed in claim 1, wherein the linear low density polyethylene has a melt flow index less than about 40 grams per 10 minutes as measured in accordance with ASTM D-1238.

4. The method as claimed in claim 1, wherein the composition further comprises a high impact polystyrene compound.

5. The method as claimed in claim 1, wherein the composition further comprises effective amounts of at least one additive selected from the group consisting of flame retardants, drip retardants, dyes, pigments, flow enhancers, impact modifiers, colorants, reinforcing agents, fillers, glass fibers, stabilizers, antistatic agents, plasticizers, and lubricants.

6. The method as claimed in claim 1, wherein the linear low density polyethylene has a melting point of about 100° C. to about 136° C.

7. The method as claimed in claim 1, wherein the polyphenylene ether resins comprises a formula:

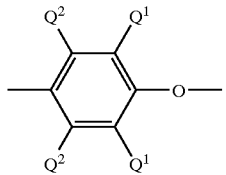

wherein each $Q^1$ or $Q^2$ is independently hydrogen, halogen, C1 to C7 primary or secondary alkyl, aryl, halohydrocarbon groups having at least two carbons between the halogen atoms and the phenyl nucleus, aminoalkyl, hydrocarbonoxy or halohydrocarbonoxy wherein at least two carbon atoms separate the halogen and oxygen atoms and at least two carbon atoms separate the halogen atoms and the phenyl nucleus.

8. The method as claimed in claim 1, wherein the composition further comprises a vinyl aromatic resin, a polyamide, a polyarylene sulfide, a polyphthalamide, a polyetheramide, or a polyester.

9. A method for reducing die lip buildup during extrusion of a polyphenylene ether composition, the method comprising:

extruding a composition comprising a polyphenylene ether resin, a linear low density polyethylene in an amount greater than or equal to about 1 to less than or equal to about 10 parts by weight for every 100 parts by weight of the polyphenylene ether resin in the composition and a high impact polystyrene compound in an amount of about 1 to about 40 parts by weight of the composition to obtain an extrudate of the polyphenylene ether resin composition, wherein lip build up is reduced relative to polyphenylene ether compositions free of the linear low density polyethylene.

10. The method as claimed in claim 9, wherein the composition further comprises a vinyl aromatic resin, a polyamide, a polyarylene sulfide, a polyphthalamide, a polyetheramide, or a polyester.

11. The method as claimed in claim 9, wherein the linear low density polyethylene has a density of about 0.88 to about 0.96 grams per cubic centimeter.

12. The method as claimed in claim 9, wherein the linear low density polyethylene has a melt flow index less than about 40 grams per 10 minutes as measured in accordance with ASTM D-1238.

13. The method as claimed in claim 9, wherein the composition further comprises a high impact polystyrene compound.

14. The method as claimed in claim 9, wherein the composition further comprises effective amounts of at least one additive selected from the group consisting of flame retardants, drip retardants, dyes, pigments, flow enhancers, impact modifiers, colorants, reinforcing agents, fillers, glass fibers, stabilizers, antistatic agents, plasticizers, and lubricants.

15. The method as claimed in claim 9, wherein the polyphenylene ether has an intrinsic viscosity of about 0.33 deciliters/gram to about 0.46 deciliters/gram as measured in chloroform at 25° C.

16. The method as claimed in claim 9, wherein the linear low density polyethylene has a melting point of about 100° C. to about 136° C.

* * * * *

UNITED STATES PATENT AND TRADEMARK OFFICE
CERTIFICATE OF CORRECTION

PATENT NO. : 6,875,387 B2
APPLICATION NO. : 10/248009
DATED : April 5, 2005
INVENTOR(S) : Mhetar et al.

It is certified that error appears in the above-identified patent and that said Letters Patent is hereby corrected as shown below:

Column 1:
Line 45 before "is" delete "build up" and insert therefor -- buildup --

Column 2:
Line 44, after "lip" delete "build up" and insert therefor -- buildup --
Line 56, after "lip" delete "build up" and insert therefor -- buildup --

Column 3:
Line 52, after "such" delete "a" and insert therefor -- as --

Column 5:
Line 7, after "metal" delete "catalysts" and insert therefor -- catalyst --

Column 6:
Line 14, after "lip" delete "build up" and insert therefor -- buildup --
Line 16, after "parts" delete "be" and insert therefor -- by --

Column 9:
Line 33, after "ether" delete "resins" and insert therefor -- resin --

Signed and Sealed this

Twenty-first Day of November, 2006

JON W. DUDAS
*Director of the United States Patent and Trademark Office*